M. JICHA.
HORSESHOE.
APPLICATION FILED APR. 8, 1920.

1,381,642.

Patented June 14, 1921.

INVENTOR.
Mathew Jicha
By H. E. Dunlap
ATTORNEY.

UNITED STATES PATENT OFFICE.

MATHEW JICHA, OF BRIDGEPORT, OHIO.

HORSESHOE.

1,381,642.  Specification of Letters Patent.  Patented June 14, 1921.

Application filed April 8, 1920. Serial No. 372,138.

*To all whom it may concern:*

Be it known that I, MATHEW JICHA, a citizen of the United States of America, and resident of Bridgeport, county of Belmont, and State of Ohio, have invented certain new and useful Improvements in Horseshoes, of which the following is a specification.

This invention relates to horseshoes, and it has for its principal object to provide a simple form of shoe, designed primarily for emergency purposes, which may be readily applied to a horse's hoof by any unskilled person without the use of nails.

In describing the invention in detail, reference is herein had to the accompanying drawings, in which—

Figure 1:
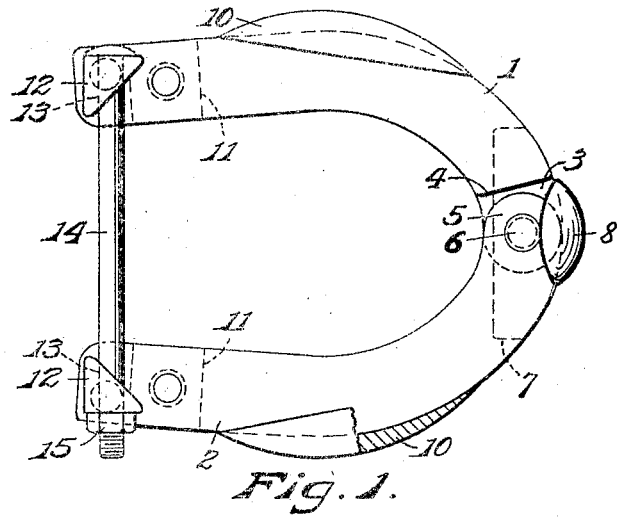
Figure 1 is a top plan view of the invention.

Referring to said drawings, 1 and 2 indicate two opposite body sections which are pivotally connected at their front ends, the section 1 having a bareface tenon 3 formed by the provision of a recess or mortise 4 in its upper face, and the section 2 having a similar tenon 5 formed by mortising its under face; and said tenons 3 and 5 being disposed in superposed relation and attached one to the other by means of a pivot pin 6.

Figure 2:
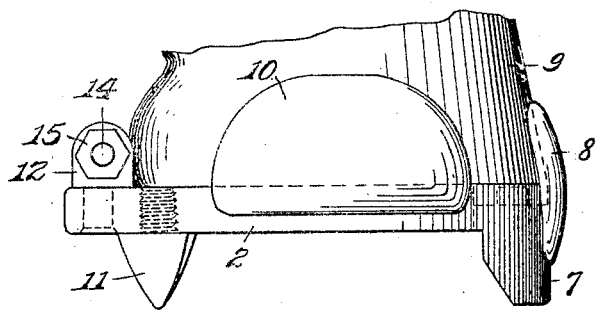
Fig. 2 is a side elevation of the invention, applied.
Figure 3:
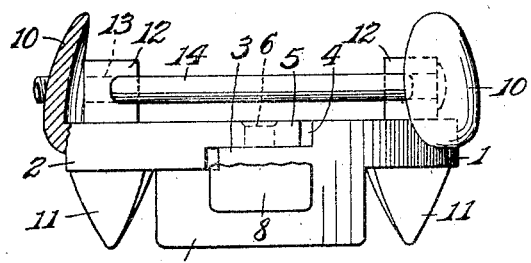
Fig. 3 is a front elevation, partly in broken section.

Welded or otherwise attached to the under side of the under tenon 3 and the adjacent portion of the body 1 is a suitable form of toe-calk 7 which has one end extended laterally into underlying supporting relation to that portion of the body 2 located adjacent to the mortise of the latter. An integral toe-piece or guard 8 is carried by and extends upward from said toe-calk 7 past the pivoted ends of the body-sections 1 and 2 and has its inner face inclined inward somewhat and curved to substantially conform to the contour of the toe portion of the hoof 9 to which the shoe is to be applied, as shown in Fig. 2.

Formed integral with or welded upon the outer lateral edge of each of the body sections 1 and 2 is an upwardly and inwardly inclined guard 10, of which the inner face has a contour designed to substantially correspond with that of the side portion of the hoof 9 which is to be received thereagainst. The guards 10 have their rear ends located sufficiently rearward to embrace the hoof slightly behind the point where the latter begins to curve inward, so that any tendency of the fitted shoe to slip forward with respect to the hoof is prevented.

Formed on or attached to the under sides of the heel portions of the sections 1 and 2 are suitable heel-calks, as 11, and fixed upon the upper faces of said heel portions, so as to occupy positions slightly rearward of the hoof to which the shoe is applied, are upright lugs or posts 12 provided with laterally directed holes 13 for the reception of a tie-bolt 14 by means of which the rear ends of said sections are attached or bound together for securing the shoe in adjusted clamping relation to the hoof 9. To facilitate the accommodation of the rear part of the hoof, said posts 12 are made of triangular form with the diagonally inclined side thereof facing toward the hoof, as is most clearly shown in Fig. 1. A nut 15 provided on the threaded end of said bolt provides means of adjustment.

As is obvious, to attach the shoe requires no special skill since it involves only the work of fitting the shoe in place and drawing the sections into closely clamping relation to the hoof by tightening the nut 15 on the bolt 14. As is manifest, a single size of shoe will readily accommodate hoofs of various sizes.

What is claimed is—

1. A horseshoe comprising two body sections pivotally connected at their front ends, a toe-calk formed on the under side of the pivoted end of one section and having an end portion underlying the bottom face of an adjacent portion of the other section, a toe guard extending upward from said toe-calk past the pivoted ends of said sections, side guards carried by said body sections in opposing relation, said side guards and toe guard being upwardly and inwardly inclined and having their inner faces curved to correspond approximately with the contour of a hoof embraced thereby, and adjustable means for securing the rear ends of said sections in fixed relation.

2. A horseshoe comprising two body sections pivotally connected at their front ends, a toe-calk formed on the under side of the pivoted end of one section and having an end portion underlying the bottom face of an adjacent portion of the other section, a toe guard extending upward from said toe-calk past the pivoted ends of said sections, side guards carried by said body sections in opposing relation, said side guards and toe guard being upwardly and inwardly inclined and having their inner faces curved to correspond approximately with the contour of a hoof embraced thereby, heel-calks carried by said sections, upright posts carried upon the upper faces of said sections adjacent to the rear ends of the latter, and adjustable means connecting said posts whereby said sections are secured in fixed relation.

3. A horseshoe comprising two body sections pivotally connected at their front ends, a toe-calk formed on the under side of the pivoted end of one section and having an end portion underlying the bottom face of an adjacent portion of the other section, a toe guard extending upward from said toe-calk past the pivoted ends of said sections, side guards carried by said body sections in opposing relation, said side guards and toe guard being upwardly and inwardly inclined and having their inner faces curved to correspond approximately with the contour of a hoof embraced thereby, heel-calks carried by said sections, upright posts carried upon the upper faces of said sections adjacent to the rear ends of the latter, said posts having alined holes therein, and a bolt disposed in said holes whereby said sections may be secured in adjusted relation.

4. A horseshoe comprising two body sections pivotally connected at their front ends, a toe-calk formed on the under side of the pivoted end of one section and having an end portion underlying the bottom face of an adjacent portion of the other section, a toe guard extending upward from said toe-calk past the pivoted ends of said sections, side guards carried by said body sections in opposing relation, said side guards and toe guard being upwardly and inwardly inclined and having their inner faces curved to correspond approximately with the contour of a hoof embraced thereby, heel-calks carried by said sections, upright posts carried upon the upper faces of said sections adjacent to the rear ends of the latter, said posts being of approximately triangular form and having their diagonal sides facing toward the center of the shoe, and a bolt directed through and connecting said posts.

In testimony whereof I affix my signature in presence of two subscribing witnesses.

MATHEW JICHA.

Witnesses:
WILLIAM JICHA,
GEORGE SCHEID.